(12) United States Patent
You et al.

(10) Patent No.: US 8,976,330 B2
(45) Date of Patent: Mar. 10, 2015

(54) TRANSPARENT LIQUID CRYSTAL DISPLAY PANEL AND TRANSPARENT LIQUID CRYSTAL DISPLAY

(71) Applicant: BOE Technology Group Co. Ltd., Beijing (CN)

(72) Inventors: Jaegeon You, Beijing (CN); Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 13/982,824

(22) PCT Filed: Mar. 14, 2013

(86) PCT No.: PCT/CN2013/072620
§ 371 (c)(1),
(2) Date: Jul. 31, 2013

(87) PCT Pub. No.: WO2013/135183
PCT Pub. Date: Sep. 19, 2013

(65) Prior Publication Data
US 2014/0063421 A1    Mar. 6, 2014

(30) Foreign Application Priority Data

Mar. 16, 2012   (CN) ...................... 2012 2 0102064 U

(51) Int. Cl.
*G02F 1/1333* (2006.01)
*G02F 1/1339* (2006.01)
*G02F 1/1335* (2006.01)
*G02B 5/20* (2006.01)

(52) U.S. Cl.
CPC ........ *G02F 1/1339* (2013.01); *G02F 1/133377* (2013.01); *G02F 1/13392* (2013.01); *G02F 1/13394* (2013.01); *G02F 1/1335* (2013.01); *G02B 5/201* (2013.01)
USPC ............................ 349/155; 349/106; 349/156

(58) Field of Classification Search
CPC .......... G02F 1/133514; G02F 1/13394; G02F 1/13392; G02F 1/133377
USPC .......................................... 349/106, 155–156
See application file for complete search history.

(56) References Cited

U.S. PATENT DOCUMENTS

2014/0063421 A1    3/2014 You et al.

FOREIGN PATENT DOCUMENTS

CN        202453611 U    9/2012
CN        202472183 U    10/2012

OTHER PUBLICATIONS

International Search Report mailed Jun. 20, 2013; PCT/CN2013/072620.
International Preliminary Report on Patentability Appln. No, PCT/CN2013/072620; Dated Sep. 16, 2014.

*Primary Examiner* — Phu Vu
(74) *Attorney, Agent, or Firm* — Ladas & Parry LLP

(57) ABSTRACT

The present disclosure provides a transparent liquid crystal display panel and a transparent liquid crystal display. The transparent liquid crystal display panel includes a backlight module, a color filter substrate and a TFT array substrate which are cell-assembled. Liquid crystal is filled between the color filter substrate and the TFT array substrate. Each pixel unit of the color filter substrate includes a sub-pixel unit and a transparent pixel unit. A region on the TFT array substrate that corresponds to the transparent pixel unit is transparent. A region between the color filter substrate and the TFT array substrate that corresponds to the transparent pixel unit is provided with a transparent resin spacer. A region in the backlight module that corresponds to the transparent pixel unit is a transparent region.

10 Claims, 1 Drawing Sheet

TRANSPARENT LIQUID CRYSTAL DISPLAY PANEL AND TRANSPARENT LIQUID CRYSTAL DISPLAY

FIELD OF THE INVENTION

The present disclosure relates to a transparent liquid crystal display panel and a transparent liquid crystal display.

BACKGROUND

With increasing development of liquid crystal technology, liquid crystal display products are playing a more and more important role in our lift. Liquid crystal products are broadly accepted due to their advantages such as low dissipation of energy, ease of flatness and environment protection. With the development of technologies, even higher end display products have drawn attention of people.

Most existing liquid crystal displays are opaque. In occasions such as exhibitions, traditional liquid crystal displays cannot bring about strong visual impacts, hence incapable of realizing expected vision promotion effects.

SUMMARY

Embodiments of the present disclosure provide a transparent liquid crystal display panel and a transparent liquid crystal display with strong visual impact.

One embodiment of the present disclosure provides a transparent liquid crystal display panel comprising a backlight module, a color filter substrate and a thin film transistor (TFT) array substrate which are cell-assembled, the color filter substrate and the TFT array substrate being filled with liquid crystal therebetween, wherein, the color filter substrate comprises a plurality of pixel units each comprising a sub-pixel unit and a transparent pixel unit defined by a black matrix; a region of the TFT array substrate corresponding to the transparent pixel unit on the color filter substrate is transparent; a transparent spacer is disposed between the color filter substrate and the TFT array substrate at the region corresponding to the transparent pixel unit; and a region of the backlight module corresponding to the transparent pixel unit is a transparent region.

In one example, the transparent spacer contacts both the color filter substrate and the TFT array substrate.

In one example, the backlight module is provided with backlight assemblies therein and the backlight assemblies are disposed in a region other than the region corresponding to the transparent pixel unit.

In one example, the TFT array substrate is provided with TFT assemblies thereon and the TFT assemblies are disposed in a region other than the region corresponding to the transparent pixel unit.

In one example, the black matrix formed on the color filter substrate has a thickness of 0.6-1.6 μm; strips of the black matrix have a width of 7-9 μm; inter-gaps of the black matrix have a width of 28.5-31.5 μm; and the sub-pixel unit and the transparent pixel unit are disposed in the inter-gaps of the black matrix.

In one example, the color filter substrate is provided with a color filter at the sub-pixel unit and a transparent resin layer at the transparent pixel unit.

In one example, both the color filter and the transparent resin layer have a thickness of 1.7-2.7 μm.

In one example, a planarization layer is formed on the black matrix, the color filter and the transparent resin layer on the color filter substrate, and parts of the planarization layer above the color filter and the transparent resin layer have a thickness of 0.5-1.5 μm.

In one example, the transparent spacer between the color filter substrate and the TFT array substrate has a height of 3-5 μm.

Another embodiment of the present disclosure provides a transparent liquid crystal display comprising a transparent liquid crystal display panel comprising a backlight module, a color filter substrate and a thin film transistor (TFT) array substrate which are cell-assembled, the color filter substrate and the TFT array substrate being filled with liquid crystal therebetween, wherein, the color filter substrate comprises a plurality of pixel units each comprising a sub-pixel unit and a transparent pixel unit defined by a black matrix; a region of the TFT array substrate corresponding to the transparent pixel unit on the color filter substrate is transparent; a transparent spacer is disposed between the color filter substrate and the TFT array substrate at the region corresponding to the transparent pixel unit; and a region of the backlight module corresponding to the transparent pixel unit is a transparent region.

In the transparent liquid crystal display panel and the transparent liquid crystal display provided in embodiments of the present disclosure, a lot of transparent pixel units are provided on the color filter substrate, regions of the TFT (Thin Film Transistor) array substrate and the backlight module that correspond to the transparent pixel units are also transparent, and regions between the color filter substrate and the TFT array substrate that correspond to the transparent pixel units are provided with transparent resin spacers. As such, the liquid crystal display panel is manufactured with many transparent regions, which realizes a transparent visual effect and can bring about strong visual impact in use and leave a deep impression for users.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
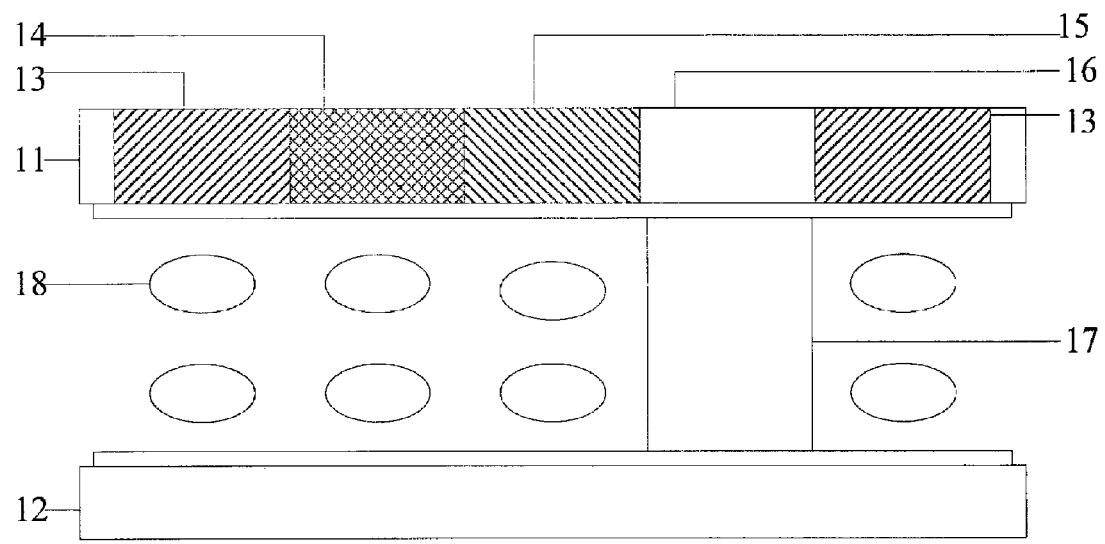
FIG. 1 is a structural representation of a transparent liquid crystal display panel provided in an embodiment of the present disclosure.

As shown in FIG. 1, a transparent liquid crystal display panel 1 is provided in an embodiment of the present disclosure, which includes: a color filter substrate 11 and a thin film transistor (TFT) array substrate 12 which are cell-assembled, with liquid crystal 18 filled therebetween.

Furthermore, the color filter substrate 11 includes a plurality of pixel units. For example, the plurality of pixel units are disposed in two dimensional array on the color filter substrate 11. Each pixel unit includes a sub-pixel unit 13, 14, 15 and a transparent pixel unit 16. Taking what is shown in FIG. 1 as an example, the sub-pixel units may include a red pixel unit 13, a green pixel unit 14 and a blue pixel unit 15.

It is worthy to note that a sub-pixel unit with configuration including three primary colors, red, green and blue is described in the embodiments of the present disclosure only as an example. Nevertheless, the number of sub-pixel units included in each pixel unit and the color of sub-pixel units are not limited thereto. For example, each pixel unit may include therein one, two or more than four sub-pixel units. Sub-pixel units may be of other colors as well.

Figure 2:
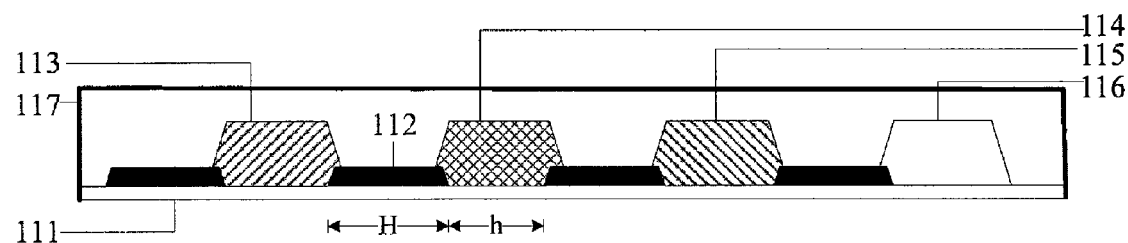
FIG. 2 is a structural representation of a color filter substrate in a transparent liquid crystal display panel provided in an embodiment of the present disclosure.

Sub-pixel units 13, 14, 16 and transparent pixel units 16 on the color filter substrate 11 are defined by a black matrix 112. In other words, the sub-pixel units 13, 14 and 16 and the transparent pixel units 16 are surrounded by the black matrix. For example, the black matrix may be a grid formed by a plurality of light-blocking strips intersecting each other. Illustratively, as shown in FIG. 2, the glass substrate 111 of the color filter substrate 11 is formed thereon with a black matrix 112 of a thickness 0.6-1.6 μm, in which the width H of strips of the black matrix, namely the width of the black matrix between sub-pixel units or between a sub-pixel unit and a transparent pixel unit, may be 7-9 μm, and the inter-gap width H of the black matrix may be 28.5-31.5 μm. For example, the sub-pixel units 13, 14 and 16 and the transparent pixel unit 16 are disposed at the inter-gaps of the black matrix.

In this embodiment, the color filters 113, 114 and 115 (e.g., formed of color filtering resin layers) used by the three primary color filter layers and the transparent resin layer 116 used by the transparent pixel units are coated in inter-gaps in the black matrix 112. The thickness of color filters and the thickness of transparent resin layers may be 1.7-2.7 μm. Furthermore, a planarization layer 117, such as a glue coating layer, is formed on the black matrix 112, the color filters 113, 114, 115 and the transparent resin layer 116. For example, parts of the planarization layer formed on the color filters 113, 114, 115 or the transparent resin layer 116 have a thickness of 0.5-1.5 μm.

As shown in FIG. 1, on the TFT array substrate 12, regions corresponding to transparent pixel units 16 are transparent. For example, these regions may not be provided with TFTs. That is, TFT components on the TFT array substrate 12 are disposed in regions other than the regions corresponding to the transparent pixel units on the color filter substrate 11. In this way, light may pass through regions of the TFT array substrate 12 which correspond to transparent pixel units.

Liquid crystal 18 is filled between the color filter substrate 11 and the TFT array substrate 12 except for regions corresponding to transparent pixel units 16 that is provided with transparent spacers 17. The material for transparent spacers may be transparent resin and their height may be 3-5 μm. For example, the transparent spacers 17 may contact both the color filter substrate 11 and the TFT array substrate 12. Therefore, there may not be any liquid crystal in regions corresponding to transparent pixel units. In this embodiment, between the color filter substrate 11 and the TFT array substrate 12, regions corresponding to red pixel units 13, green pixel units 14 and blue pixel units 15 are provided with liquid crystal 18, regions corresponding to transparent pixel units 16 are provided with transparent resin spacers 17, thereby reducing consumption of liquid crystal and saving manufacturing cost.

It is worthy to note that after transparent spacers 17 are disposed between the color filter substrate 11 and the TFT array substrate 12, no additional spacers are needed for regions of red pixel units 13, green pixel units 14 and blue pixel units 15. Therefore, the above-mentioned transparent spacers 17 may function as spacers for maintaining cell thickness of liquid crystal display panel.

In addition, embodiments according to the present disclosure further include a backlight module as a light source for the liquid crystal display panel. For example, the backlight module may be disposed on one side of the TFT array substrate 12 such that light emitted from the backlight may pass the TFT array substrate 12, the liquid crystal layer 18 and the color filter substrate 11 successively. Accordingly, the backlight module (not shown in FIG. 1) emits light only towards regions of red pixel units 13, green pixel units 14 and blue pixel units 15. Regions of backlight that correspond to transparent pixel units 16 are transparent regions and do not emit light. To ensure that these regions are transparent, for example, no backlight module such as reflection plate is disposed in the regions. That is, backlight components or assemblies in the backlight module are disposed in regions other than the regions corresponding to transparent pixel units. Disposing no reflection plate in regions of the backlight module that correspond to transparent pixel units may ensure that these regions do not emit light as well, thereby ensuring light transmittance.

For the transparent liquid crystal display panel according to embodiments of the present disclosure, sub-pixel units 13, 14 and 15 modulate liquid crystal of individual sub-pixel units according to the control of image signal, thereby displaying images, while transparent pixel units may transmit ambient light from backside of the liquid crystal display panel. The liquid crystal display panel is manufactured with many transparent regions, which realizes transparent visual effect and can bring about strong visual impact in use and leave a deep impression for users.

Furthermore, after cutting the above-mentioned transparent liquid crystal display panel and assembling electronic elements, finished products of transparent liquid crystal displays may be obtained. Any appropriate processes and elements in the art may be used for cutting the panel and assembling electronic elements, no further description will be provided.

A manufacturing process of the above-mentioned transparent liquid crystal display panel will be explained below, taking sub-pixel units of three primary colors as an example too. The method includes steps of:

S101, Preparing a color filter substrate.

Specifically, a black matrix may be formed first by patterning process on a glass substrate, which has a thickness of 0.6-1.6 μm, strip width of 7-9 μm and inter-gap width of 28.5-31.5 μm.

Thereafter, red filtering resin, green filtering resin, blue filtering resin and transparent resin are formed, e.g. by spraying, in inter-gaps of the black matrix separately, forming a color filter and transparent resin layer with a thickness of 1.7-2.7 μm.

Finally, a planarization layer, such as glue coating layer, is coated on the black matrix, the color filter and the transparent resin layer. Parts of the planarization layer above the color filter and the transparent resin layer have a thickness of 0.5-1.5 μm.

S102. Preparing a TFT array substrate.

Specifically. while processing and preparing TFT components by patterning process on the glass substrate, regions corresponding to transparent pixel units on the color filter substrate may not be formed with TFT components. That is, TFT components on the TFT array substrate are formed in regions other than the regions corresponding to transparent pixel units. In addition, regions on the TFT array substrate that correspond to transparent pixel units are formed to be transparent.

There is no sequential relationship between steps S101 and S102, which may be performed at the same time or sequentially.

S103. Forming a liquid crystal alignment layer on the color filter substrate and the TFT array substrate. For example, the color filter substrate liquid crystal alignment layer and the TFT array substrate liquid crystal alignment layer are formed by coating a light alignment material on the color filter substrate and the TFT array substrate and exposing them to polarized ultraviolet light with a wavelength of 254 nm and light energy of 1-10 J/cm$^2$. In addition, the material for forming the liquid crystal alignment layer is not limited to the light alignment material, and alignment layer materials suitable for friction alignment may also be used.

S104. Forming transparent resin spacers in regions corresponding to transparent pixel units on the color filter substrate or the TFT array substrate. For example, the transparent resin spacers may have a thickness of 1.7-2.7 μm.

S105. Filling liquid crystal material into a cell formed by the color filter substrate and the TFT array substrate. For example, the liquid crystal material may be dropped onto the color filter substrate or the TFT array substrate first, then the color filter substrate or the TFT array substrate are cell-assembled; alternatively, it is also possible to cell-assemble the color filter substrate and the TFT array substrate first, and then liquid crystal material is injected between the color filter substrate and the TFT array substrate.

The transparent liquid crystal display panel manufactured with this method has many transparent regions, which realizes transparent visual effect and can bring about strong visual impact in use and leave a deep impression for users.

The foregoing are merely exemplary embodiments of the invention, but are not used to limit the protection scope of the invention. The protection scope of the invention shall be defined by the attached claims.

What is claimed is:

1. A transparent liquid crystal display panel comprising a backlight module, a color filter substrate and a thin film transistor (TFT) array substrate which are cell-assembled, the color filter substrate and the TFT array substrate being filled with liquid crystal therebetween, wherein, the color filter substrate comprises a plurality of pixel units each comprising a sub-pixel unit and a transparent pixel unit defined by a black matrix;

a region of the TFT array substrate corresponding to the transparent pixel unit on the color filter substrate is transparent;

a transparent spacer is disposed between the color filter substrate and the TFT array substrate at the region corresponding to the transparent pixel unit; and a region of the backlight module corresponding to the transparent pixel unit is a transparent region.

2. The transparent liquid crystal display panel according to claim 1, wherein the transparent spacer contacts both the color filter substrate and the TFT array substrate.

3. The transparent liquid crystal display panel according to claim 1, wherein the backlight module is provided with backlight assemblies therein and the backlight assemblies are disposed in a region other than the region corresponding to the transparent pixel unit.

4. The transparent liquid crystal display panel according to claim 1, wherein the TFT array substrate is provided with TFT assemblies thereon and the TFT assemblies are disposed in a region other than the region corresponding to the transparent pixel unit.

5. The transparent liquid crystal display panel according to claim 1, wherein the black matrix formed on the color filter substrate has a thickness of 0.6-1.6 μm; strips of the black matrix have a width of 7-9 μm; inter-gaps of the black matrix have a width of 28.5-31.5 μm; and the sub-pixel unit and the transparent pixel unit are disposed in the inter-gaps of the black matrix.

6. The transparent liquid crystal display panel according to claim 1, wherein the color filter substrate is provided with a color filter at the sub-pixel unit and a transparent resin layer at the transparent pixel unit.

7. The transparent liquid crystal display panel according to claim 6, wherein both the color filter and the transparent resin layer have a thickness of 1.7-2.7 μm.

8. The transparent liquid crystal display panel according to claim 6, wherein a planarization layer is formed on the black matrix, the color filter and the transparent resin layer on the color filter substrate, and parts of the planarization layer above the color filter and the transparent resin layer have a thickness of 0.5-1.5 μm.

9. The transparent liquid crystal display panel according to claim 1, wherein the transparent spacer between the color filter substrate and the TFT array substrate has a height of 3-5 μm.

10. A transparent liquid crystal display comprising a transparent liquid crystal display panel comprising a backlight module, a color filter substrate and a thin film transistor (TFT) array substrate which are cell-assembled, the color filter substrate and the TFT array substrate being filled with liquid crystal therebetween, wherein, the color filter substrate comprises a plurality of pixel units each comprising a sub-pixel unit and a transparent pixel unit defined by a black matrix;

a region of the TFT array substrate corresponding to the transparent pixel unit on the color filter substrate is transparent;

a transparent spacer is disposed between the color filter substrate and the TFT array substrate at the region corresponding to the transparent pixel unit; and a region of the backlight module corresponding to the transparent pixel unit is a transparent region.

\* \* \* \* \*